US012058985B2

(12) United States Patent
Tumolo et al.

(10) Patent No.: US 12,058,985 B2
(45) Date of Patent: Aug. 13, 2024

(54) AQUACULTURE LUMINAIRE AND LIGHTING SYSTEM, AND A LIGHTING METHOD

(71) Applicant: SIGNIFY HOLDING B.V., Eindhoven (NL)

(72) Inventors: Massimo Tumolo, Utrecht (NL); Sri Andari Husen, Eindhoven (NL); Marcellinus Petrus Carolus Michael Krijn, Eindhoven (NL); Lambertus Adrianus Marinus De Jong, Son (NL); Yannick Martinus Denise Morel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/024,115

(22) PCT Filed: Sep. 3, 2021

(86) PCT No.: PCT/EP2021/074330
§ 371 (c)(1),
(2) Date: Mar. 1, 2023

(87) PCT Pub. No.: WO2022/049227
PCT Pub. Date: Mar. 10, 2022

(65) Prior Publication Data
US 2023/0263142 A1 Aug. 24, 2023

(30) Foreign Application Priority Data
Sep. 3, 2020 (EP) .................................... 20194309

(51) Int. Cl.
*F21V 14/04* (2006.01)
*A01K 63/06* (2006.01)
(Continued)

(52) U.S. Cl.
CPC .............. *A01K 63/06* (2013.01); *F21V 14/04* (2013.01); *F21V 23/0471* (2013.01); *F21W 2131/308* (2013.01)

(58) Field of Classification Search
CPC ..... A01K 63/06; F21V 14/04; F21V 23/0471; F21W 2131/308
See application file for complete search history.

(56) References Cited

U.S. PATENT DOCUMENTS

| 5,465,014 A | * | 11/1995 | Avvisati | H05B 3/80 |
| | | | | 219/523 |
| 2004/0105264 A1 | * | 6/2004 | Spero | H05B 45/20 |
| | | | | 362/276 |

(Continued)

FOREIGN PATENT DOCUMENTS

| JP | H0638109 U | 5/1994 |
| KR | 1395477 B1 | 5/2014 |

(Continued)

OTHER PUBLICATIONS

English translation of NO 343418 Oxyvision (original document cited in IDS filed Mar. 1, 2023) published Mar. 2019 (Year: 2019).*

(Continued)

*Primary Examiner* — Evan P Dzierzynski (57) ABSTRACT

An aquaculture luminaire (10, 12) generates below the water surface upward light (26) and downward light (24). The upward light (26) is all directed with an angle to the vertical greater than a threshold angle. The division of light between the upward and downward directions may be configurable. Alternatively or additionally, the threshold angle may be configurable so that it ensures the light exceeds the angle for total internal reflection at the water surface. In this way, the (Continued)

luminaire is adaptable to the intended installation position of the luminaire and/or the prevailing water surface conditions (e.g. waves).

13 Claims, 3 Drawing Sheets

(51) Int. Cl.
*F21V 23/04* (2006.01)
*F21W 131/308* (2006.01)

(56) References Cited

U.S. PATENT DOCUMENTS

| | | |
|---|---|---|
| 2013/0152864 A1 | 6/2013 | Grajcar et al. |
| 2014/0247584 A1* | 9/2014 | Kodama ............ H05B 47/10 362/183 |
| 2015/0130351 A1* | 5/2015 | Braunstein ............ H05B 45/20 315/86 |
| 2017/0127656 A1* | 5/2017 | Bee .................. C12M 1/002 |
| 2019/0100445 A1* | 4/2019 | Dobrinsky ............ A61L 2/10 |
| 2020/0229405 A1* | 7/2020 | Lowry ................ H05B 45/10 |
| 2020/0288678 A1* | 9/2020 | Howe ................ G01S 17/86 |
| 2020/0288680 A1* | 9/2020 | Howe ................ A01K 61/13 |

FOREIGN PATENT DOCUMENTS

| | | |
|---|---|---|
| NO | 334390 B1 | 2/2014 |
| NO | 343418 B1 | 3/2019 |
| WO | 2019121887 A1 | 6/2019 |

OTHER PUBLICATIONS https://www.bgbinnovation.com/piscesaquaculture/ Jun. 7, 2020, pp. 1-4.

BGB Marine Underwater Light & Vision, Issue M03, Jul. 2, 2011.

* cited by examiner

AQUACULTURE LUMINAIRE AND LIGHTING SYSTEM, AND A LIGHTING METHOD

CROSS-REFERENCE TO PRIOR APPLICATIONS

This application is the U.S. National Phase application under 35 U.S.C. § 371 of International Application No. PCT/EP2021/074330, filed on Sep. 3, 2021, which claims the benefit of European Patent Application No. 20194309.9, filed on Sep. 3, 2020. These applications are hereby incorporated by reference herein.

FIELD OF THE INVENTION

This invention relates to an aquaculture luminaire and lighting system, and a lighting method.

BACKGROUND OF THE INVENTION

Aquaculture is the marine counterpart of agriculture, wherein aquatic animals, such as fish, are bred under controlled conditions, or aquatic plants are harvested. Examples of fish bred under these circumstances include salmon, tilapia, catfish, sea bass, bream and trout. Aquaculture is a fast developing area that has undergone several major changes in the past decades. In particular, aquaculture is gaining considerable importance in feeding the world in a sustainable manner.

There are may different applications for aquaculture, some of them are based on improving the growth of a fish population or its quality, others affect smaller-scale systems like aquariums to improve coral growth. Edible seaweeds and algae are interesting markets too, considering for example that both are already widely used in Eastern countries and are gaining more and more attention in the rest of the world.

It is well known that light plays an important role in aquaculture, for example both in indoor fresh water and in outdoor fresh or marine water.

Known illumination systems for such applications apply conventional artificial light sources, such as metal halide lamps. These lamps are switched on when artificial light is to be applied. More recently, it has been proposed to apply light sources comprising light emitting diodes (LEDs). The main advantage of LED systems is that such systems allow better control of the light intensity, beam shape and color of the emitted light.

For a best efficiency in delivering the light to the desired location, a luminaire should be submerged in the water. However, water is a harsh environment for luminaires to be in, particularly in open water (sea or ocean) fish farming. This presents many challenges for example due to the varying temperature, the waves, the tide, undesired biofouling, and so on.

One challenge is keeping the light output predictable, stable and efficient. One approach is to suspend a luminaire at a fixed distance below the water surface using a float (buoy). The luminaire then follows the tide. It is instead an option to fix a luminaire underwater at a fixed height, instead of following the tide, as this enables a more robust fixation of the luminaire.

It is desired to provide homogeneous lighting across different depths. This means that for a luminaire positioned at a depth beneath the water surface, the light output should be emitted upwardly and downwardly. The appropriate proportion of light emitted upwardly and downwardly will depend on the depth of the luminaire, and the depth of the volume to be illuminated. Thus, each luminaire must be designed for its exact intended use.

Emitting light upwardly can also be inefficient, because light below the critical angle of the water-air boundary will exit the water volume. It has been proposed to avoid emitting upward light at angles which allow the light to escape from the body of water. However, this escape condition (i.e. the critical angle for total internal reflection) depends on the shape characteristics of the water surface and the angular relationship between the light source and the water surface, so it is not straightforward to prevent light escape.

NO 343 418 B1 relates to a system for illuminating a body of water in which fish are or may be located, wherein the system comprises a number of light sources arranged in two or more layers above each other over at least a part of a vertical extent of a cage, where the light sources are further arranged near or around an outer circumference of the cage, where light sources in a layer can be arranged either horizontally or vertically.

The invention is directed to some or all of these issues.

SUMMARY OF THE INVENTION

The invention is defined by the claims.

According to examples in accordance with an aspect of the invention, there is provided an aquaculture luminaire for underwater use, comprising:

a light source arrangement for generating a first light output portion and a second light output portion, wherein, when the luminaire is in an intended operational orientation relative to the vertical, the light of the first light output portion has a downward direction component and the light of the second light output portion has an upward direction component, wherein the light of the second light output portion is all directed with an angle to the vertical greater than a threshold angle, wherein the light source arrangement is configurable to adjust:

the division of light between the first and second light output portions and/or the threshold angle.

This luminaire is for use underwater, for an aquaculture system. Light is emitted both downwardly (and typically also laterally, i.e. with a downward direction component) and upwardly (and also laterally, i.e. with an upward direction component). The upward light excludes light below a threshold angle to the vertical. This is light which would pass through the water-air boundary at the water surface. By excluding this light, the light of the second light output portion undergoes total internal reflection at the water air boundary, and thus more efficiently illuminates the water volume.

In this way, a stable and efficient lighting system is enabled to provide homogeneous lighting across different depths. As a result, fewer luminaires may be needed. By ensuring the use of total internal reflection at the water surface, a stronger and more homogeneous light distribution is achieved.

By making the division of light between the first and second light output configurable, the light output may be adjusted to take account of different depths of use. For example, a deep luminaire should emit more light upwardly and less light downwardly than a shallow luminaire. In this way, the combination of luminaires at different depths can provide more uniform illumination of the volume to be illuminated, without generation of a significant light intensity outside the volume of interest, giving reduced efficiency.

By making the threshold angle configurable, the light output may be adjusted to ensure the light reaching the water air boundary remains above the critical angle for different use conditions and/or different water conditions.

In a basic implementation, the luminaire may be configured for use at different depths from the water surface by adjusting the division of light between the first and second light output portions. This then enables a same luminaire design to be configured for use at different depths. Multiple luminaires at different depths may then form an overall illumination system.

The second light output portion may comprise light all with the same light emission angle relative to the vertical, and that direction may then be controlled to implement the threshold angle configuration. Alternatively, the second light output portion may include a range of angular emission directions relative to the vertical, and the threshold angle configuration ensures that the range excludes light below the threshold angle (and hence too close to the vertical).

The light source arrangement may comprise an array of light sources, with different light sources providing a light output in different directions relative to the vertical, wherein the configuration is achieved by actuating selected light sources of the array.

Thus, the light output direction or range of directions may be adapted by choosing the appropriate light sources to be actuated.

The array of light sources for example provide light output in different radial directions relative to the vertical axis as well as different angles to the vertical axis. The light output may for example extend all around the luminaire, thus forming a band of illumination. There may then be light sources arranged as segments at different angular positions around the vertical. In this way, the threshold angle does not need to be the same for all radial directions; it may be different in different radial directions.

Alternatively, a beam shaping component may be provided in the path of the second light output portion, wherein the configuration is achieved by adjusting the position of the beam shaping component. The beam shaping component for example comprises a reflector or a refractive component such as a lens.

In all cases, the configuration may be dynamically adaptable in use. The light output may then adapt to the conditions in which the luminaire is used, such as the shape of the water surface, or the orientation of the luminaire, or the depth of the water above the luminaire (which will change with the tides if the luminaire is at a fixed position and the luminaire is used in tidal water).

For example, a tilt sensor may be provided for sensing an orientation of the luminaire relative to the vertical. The dynamic configuration may in this way take account of changes in the orientation of the luminaire, to ensure that the emitted light meets the desired threshold characteristics even if the luminaire has moved, for example by underwater currents.

The invention also provides a lighting arrangement, comprising:
the luminaire defined above;
a float for floating on a surface of water; and
a suspension system for suspending the luminaire at a distance below the surface of the water, wherein the division of light between the first and second light output portions is configured in dependence on the distance.

This defines a combination of the luminaire and the float used to suspend the luminaire in the water. The depth of suspension is used to determine the configuration of the light source arrangement. This may be a one-off calibration during installation of the lighting arrangement.

The lighting system may comprise a plurality of identical lighting arrangements as defined above, at least some of which are at different depths and with differently configured division of light. Thus, a system with luminaires suspended at multiple depths may use the same luminaire design but configured to the respective depth at which the luminaire is to be used.

The invention also provides a lighting system comprising:
the luminaire defined above, with dynamic control of the threshold angle; and
a motion and/or position sensor for sensing a motion and/or position of a water surface above the luminaire; and
a controller for adapting the threshold angle dynamically in dependence on the motion and/or position of a water surface.

This enables the water surface shape and evolution to be taken into account by dynamically controlling the threshold angle. This enables the lighting to adapt to the shape of waves or even tides (which is relevant if the luminaire is not at a fixed suspended depth from the water surface).

The motion and/or position sensor for example comprises an accelerometer and a gyroscope. This enables both position and orientation tracking so that wave shapes can be monitored.

The motion and/or position sensor preferably comprises an array of accelerometers and an array of gyroscopes for monitoring the water surface at a plurality of locations. By using an array, both wave shapes and directions of travel can be determined.

The controller is then for example adapted to:
monitor the water surface height at said plurality of locations over time;
determine a wave velocity, amplitude and direction from said surface heights;
determine a critical angle of the water surface in the vicinity of the luminaire over time based on the wave velocity, amplitude and direction; and
configure the threshold angle in dependence on the critical angle.

This is an implementation in which only height information, i.e. local wave amplitude, is processed. From this, a model of the wave progression may be derived so that the local water surface conditions (above the luminaire) can be determined and also predicted In a more complex implementation, sensor orientation information may also be used to better model the water surface behavior.

The lighting system may again further comprises:
a float for floating on a surface of water; and
a suspension system for suspending the luminaire at a distance below the surface of the water.

The invention also provides method of providing underwater lighting for aquaculture, comprising:
providing a luminaire having a light source arrangement for generating a first light output portion and a second light output portion, wherein, when in an intended operational orientation relative to the vertical, the light of the first light output portion has a downward direction component and the light of the second light output portion has an upward direction component; and configuring:
the division of light between the first and second light output portions and/or
a threshold angle of the luminaire wherein light of the second light output portion is all directed with an angle to the vertical greater than the threshold angle.

The division of light may be configured in dependence on the depth at which the luminaire will be mounted. The division of light may instead be configured dynamically if the luminaire is at a fixed position, in order to adapt to the varying depth of the luminaire due to the tides. The threshold angle may be configured dynamically in use for example to adapt to a tilt of the luminaire or to adapt to the water surface profile.

The method may comprise:
monitoring the water surface height at a plurality of locations over time;
determining a wave velocity, amplitude and direction from said surface heights;
determining a critical angle of the water surface in the vicinity of the luminaire over time based on the wave velocity, amplitude and direction; and
configuring the threshold angle dynamically in use in dependence on the critical angle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an aquaculture luminaire which generates upward and downward light. The upward light is all directed with an angle to the vertical greater than a threshold angle. The division of light between the upward and downward directions may be configurable. Alternatively or additionally, the threshold angle may be configurable so that it ensures the light exceeds the angle for total internal reflection at the water surface. In this way, the luminaire is adaptable to the intended installation position of the luminaire and/or the prevailing water surface conditions (e.g. waves).

Figure 1:
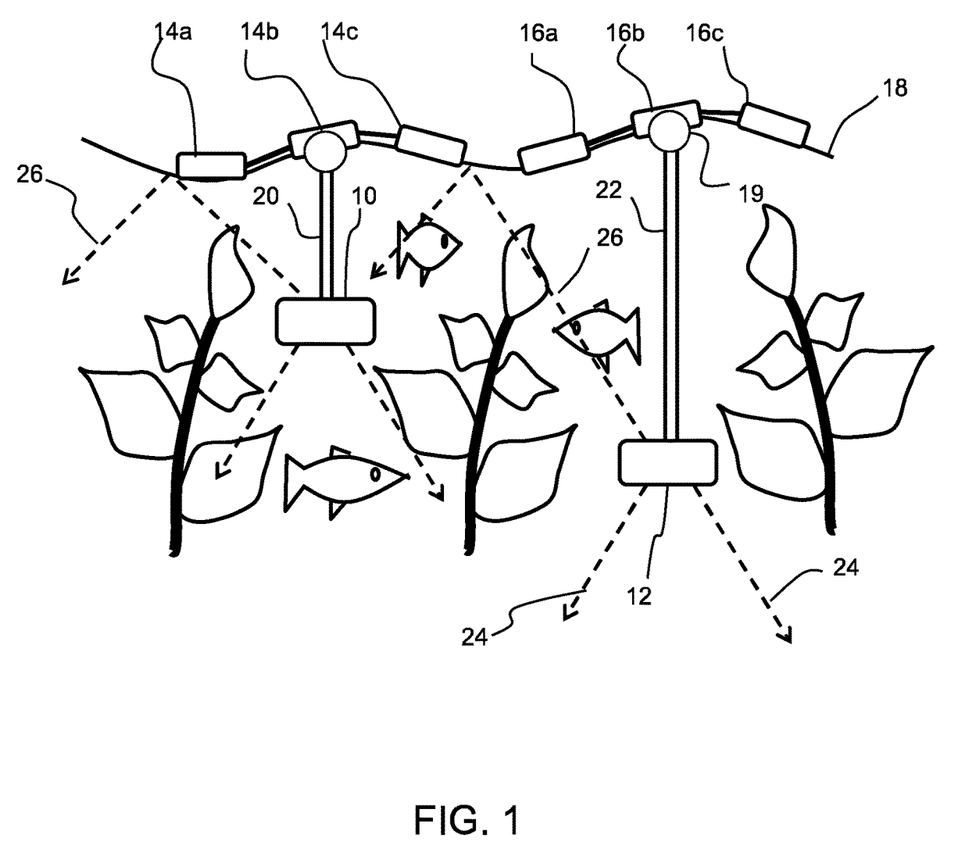
FIG. 1 shows a lighting system for aquaculture.

FIG. 1 shows a lighting system for aquaculture. For example the lighting system is for use in netted fish farming areas in the open sea or ocean. For simplicity, two lighting arrangements area shown. The term "lighting arrangement" is used to denote a luminaire (i.e. the actual light source arrangement and associated drive electronics) in combination with external sensors and a mounting arrangement, as discussed further below. These external sensors are used for dynamically controlling the luminaires. However this is an option, and a more basic system may implement only static configuration of the luminaires without real time sensing.

The sensors, when present, are used to monitor the orientation of the luminaire and/or the water surface conditions. Each sensor for example comprises a floating sensor bank having a linear motion sensor e.g. accelerometer and an angular motion sensor e.g. gyroscope. The motion information enables a position to be determined in space and optionally also an orientation.

The dynamic configuration, when used, is for adapting the light output to the conditions in which the luminaire is used, such as the shape of the water surface, or the orientation of the luminaire, or the depth of the water above the luminaire (which will change with the tides if the luminaire is at a fixed position and the luminaire is used in tidal water).

Each lighting arrangement in the example shown thus comprises a luminaire 10, 12, and a set of sensors. Sensors 14a, 14b, 14c are associated with luminaire 10 and sensors 16a, 16b, 16c are associated with luminaire 12. However, the sensors may instead be considered as a single combined set and the information from all sensors may be processed together, for example to derive information about the surface condition of the water across the overall area of the aquaculture enclosure.

As shown, the two lighting arrangements have their luminaires 10, 12 at different depths below the water surface 18. This enables the overall set of luminaires to provide more uniform illumination of the volume to be illuminated.

The lighting arrangement comprises a mounting unit as mentioned above. In the example shown, the mounting unit comprises a float 19 for floating on a surface 18 of the water. The float may be implemented by the sensors, or it may be a separate flotation device. A suspension system 20, 22 then suspends the luminaire 10, 12 at a distance below the surface of the water.

However, luminaires at different depths are preferably configured differently, so that the illumination across the depth of the enclosure is made more uniform. In particular, a greater light output intensity is needed for light to reach more distant areas. Thus, if a luminaire is deeper, a greater light output intensity may be desired in the upward direction. This of course results in a non-uniform light intensity distribution from each individual luminaire. By having multiple luminaires at different depths, the illumination to each region within the 3D volume can be made more uniform.

A first aspect of the invention thus takes account of the depth of the suspension in order to determine the configuration of the light source arrangement. This may be a one-off calibration during installation of the lighting arrangement.

For this purpose, the luminaires each comprise a light source arrangement for generating a first light output portion 24 and a second light output portion 26. When the luminaire is in its intended operational orientation relative to the vertical (as shown), the light of the first light output portion 24 has a downward direction component and the light of the second light output portion 26 has an upward direction component.

The light output in the upward and downward directions will have a range of emission directions. Most or all of the light emitted downwardly will include a lateral (sideways) direction component, so that a generally cone shaped beam is directed downwardly. Similarly, all of the light emitted upwardly will include a lateral (sideways) direction component, so that a generally cone shaped beam is directed upwardly, but with a hollow center so that no light is emitted directly upwardly.

For convenience, the output light will be referred to simply as upward and downward, but this should be understood with reference to the above explanation.

The upward light, i.e. the second light output portion, is all directed with an angle to the vertical greater than a threshold angle. In this way, it is ensured that the upward light undergoes total internal reflection at the water-air boundary at the surface 18.

In accordance with this first aspect, the light source arrangement is configurable to adjust the division (i.e. ratio) of light between the upward and downward light. This enables further uniformity to be achieved, compared to an arrangement with identical luminaires at different depths.

Thus, the luminaire 10 may for example provide a similar light output intensity in the upward and downward directions, whereas the luminaire 12 at a greater depth may provide a greater proportion of light in the upward direction (but with the constraint on the emission angle as explained above).

This luminaire is thus positioned underwater for direct light coupling into the farming volume of an aquaculture system. Light is emitted both downwardly and upwardly. The upward light excludes light below a threshold angle to the vertical. This is light which would pass through the water-air boundary at the water surface. A stable and efficient lighting system is thereby enabled to provide homogeneous lighting across different depths. As a result, fewer luminaries my be needed.

By making the division of light between the upward and downward direction (i.e. the first and second light output portions) configurable, the light output may be adjusted to take account of different depths of use. This then enables a same luminaire design to be configured for use at different depths. Multiple and identical luminaires at different depths, and configured differently, may then form an overall illumination system.

A basic way to implement this configurability is to provide an array of lighting sources, such as LEDs. The overall light output in the upward and downward directions may then be controlled based on the number of LEDs that is controlled to be actuated.

In accordance with a second aspect, the threshold angle mentioned above, which determines whether or not light is maintained above the critical angle of the water-air boundary, is configurable. By making the threshold angle configurable, the light output may be adjusted to ensure the light reaching the water-air boundary remains above the critical angle for different water conditions or luminaire orientations.

The luminaire orientation may for example change over time due to water currents beneath the surface of the water. A tilt sensor may be used to detect the angle of the luminaire relative to the vertical, and the angle of emitted light may then be adjusted accordingly. This adjustment may for example be different at different sides (in the plane including the angle of tilt). For example, if the luminaire is tilted clockwise in a plane, the light emitted from the left side will need a reduced upward component, whereas the light emitted from the right side can tolerate an increased upward component.

Water conditions may be monitored because the sea, or open water in general, does not have a still and flat surface because of the tide and waves. This means that the upward light may in a more complex implementation be adapted dynamically so as not to impinge on the water surface at angles lower than the critical angle, despite the tide and waves. The sensors, in particular accelerometers and optionally also gyroscopes in the vicinity of the luminaire (or indeed inside the luminaire), may be used to monitor the waves and this monitoring can then be used to automatically adapt the beam direction, or the beam spread of the upward light, without any manual intervention. The sensors may thus enable the wave motions to be modelled.

Figure 2:
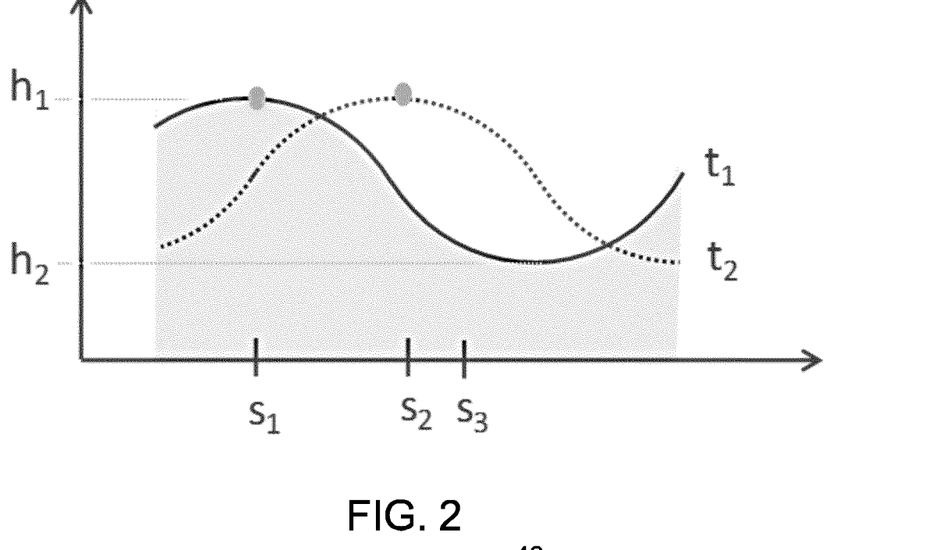
FIG. 2 shows how the measurement of position by means of floating sensors on a wave over time and space may be used.

FIG. 2 shows how the measurement of position by means of floating sensors on a wave over time and space may be used. This basic implementation only requires the sensor height to be measured, and the result is that the wave amplitude is monitored.

Multiple sensors are needed to predict how waves evolve over time and space. FIG. 2 shows a simplified arrangement with two sensors located at positions $S_1$ and $S_2$.

Let $\Delta t_{21} = t_2 - t_1$ be the difference in time between a peak measured at location $S_2$ and a peak measured at location $S_1$. The wave velocity v can be calculated to be:

$$v = (S_2 - S_1)/\Delta t_{21}.$$

$S_2 - S_1$ is the distance between the sensors. If a luminaire is placed at a position $S_3$, it can be predicted that the peak of the wave is going to reach that luminaire at time $\delta t = (S_3 - S_2)/v$ after the peak reached $S_2$.

This is a simple case where the two sensors catch the wave on its ascent and descent phase, however more complex cases can be handled with a denser sensor network.

Measuring the wave height h versus time (h(t)) at location $S_1$ (and/or $S_2$) and knowing the wave velocity v allows the wave profile to be reconstructed. Knowing the wave profile and wave velocity enables a calculation of the slope of the wave at locations close to the luminaire at location $S_3$.

The critical angle with respect to the water surface normal can then be obtained (the normal to the water surface will now be tilted with respect to the normal to a horizontal surface due to the waves).

This simplified explanation applies to a single direction. Of course, an approach based on two orthogonal directions will enable a 3D wave surface shape to be determined from which an angle of the normal to the surface can be obtained in 3D space.

The same network of gyroscopes and accelerometers, integrated in the aquaculture luminaires or in the floating buoy coupled to the lamps, can be used to estimate the tide.

The water height due to the tide is not relevant to a system in which the luminaire is suspended at a fixed distance below the water surface, but it may be used if the luminaire is at a fixed position. In this case, the luminaire depth changes over time.

The division between upward and downward light may then be adapted in the manner explained above, but in a dynamic manner rather than as an initial luminaire calibration.

These various measures can be used to keep the light distribution uniform and stable independently from the water conditions.

The upward light (i.e. the second light output portion) may comprise light all with the same light emission angle relative to the vertical, and that direction may then be controlled as the threshold angle configuration. Alternatively, the upward light may include a range of angular emission directions relative to the vertical, and the threshold angle configuration ensures that the range excludes light below the threshold angle (and hence too close to the vertical).

Figure 3:
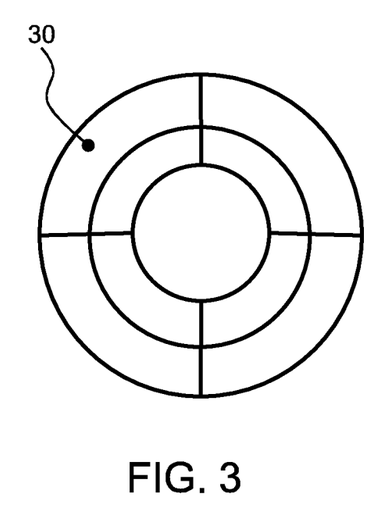
FIG. 3 shows a first example of an array of light sources in plan view for the upward emitted light.
Figure 4:
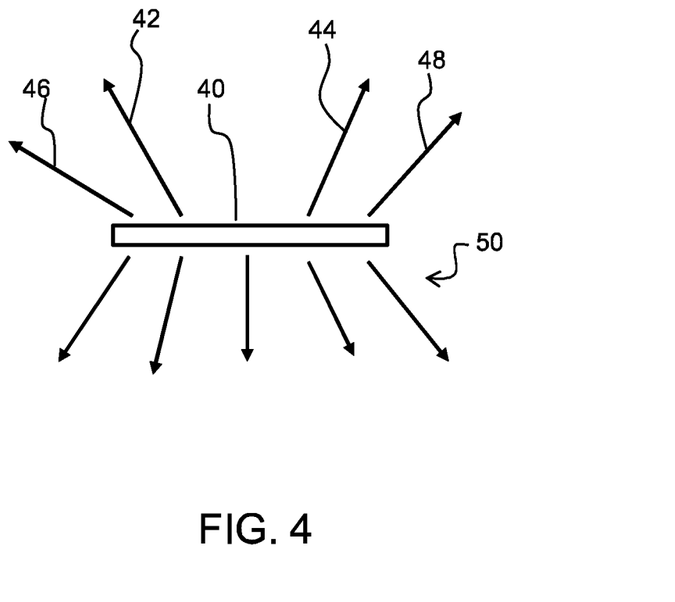
FIG. 4 shows a side view for the upward and downward light from the light source arrangement of FIG. 2.

FIG. 3 shows an array of light sources 30 in plan view for the upward emitting light, and FIG. 4 shows a side view for the upward and downward light from the light source arrangement 40.

Different light sources 30 provides a light output in different directions relative to the vertical. The configuration (whether to change the angular distribution relative to the vertical or to change the ratio between the upward and downward light) may then achieved by actuating selected light sources of the array.

FIG. 4 shows that the upward light has shallow portions 42, 44, e.g. from an inner segmented ring of light sources. These have a first light emission direction relative to the vertical. The upward light has steep portions 46, 48, e.g. from an outer ring of segmented light sources. These have a second light emission direction relative to the vertical larger than the first angle.

Thus, the light output direction or range of directions may be adapted by choosing the appropriate light sources to be actuated.

The downward light 50 does not need to exclude the vertically downward light.

Of course, the light source arrangement may be pixelated with a much greater number of individual light sources. By providing segmentation angularly around the vertical axis, as shown, the threshold angle may be controlled in different radial directions.

The light sources may have their outputs directed in different directions in a number of different ways. In one approach, all light sources for emitting light in one direction are mounted on shared substrate, and that substrate is oriented in a desired direction. Thus, the different lights sources and their substrates may all be the same. In another approach, there is one array of light sources over a common substrate and different lenses are formed over different light sources. These lenses may however all be formed as a single molded lens plate.

Instead of (or as well as) a segmented light source arrangement, a beam shaping component may be provided in the path of the upward light, wherein the configuration is achieved by adjusting the position of the beam shaping component. The beam shaping component for example comprises a reflector or a refractive component such as a lens.

Figure 5:
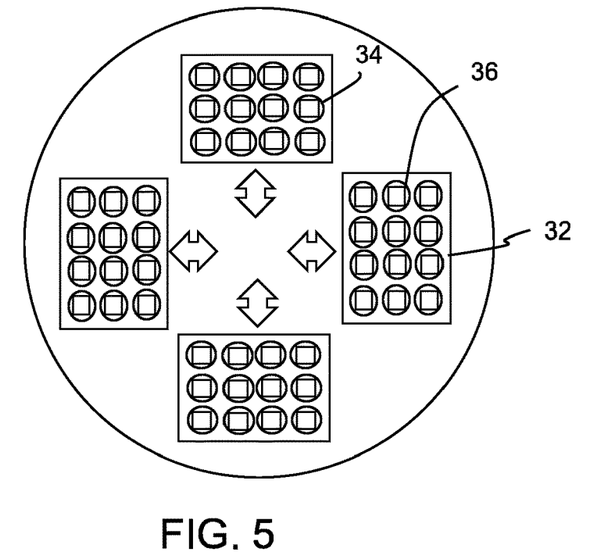
FIG. 5 shows a second example of an array of light sources in plan view for the upward emitted light.

FIG. 5 shows a plan view of four lens plates 32 of individual lenses 36 (the circles) over LEDs (such as surface mount devices) 34 (the squares). Moving a lens plate relative to its LEDs changes the light output direction. If each lens plate 32 is independently movable, as represented by arrows, the light emission direct can be different at different radial angles. Alternatively, they may be moved in unison.

A single light source may instead be used, and a lens may be moved toward and away from the light source to change the beam angle. A reflecting element may instead be used to reflect the normally emitted portion of the light from the light source for example to a lateral direction (to enable the light still to be used). The position of the reflecting element, for example along the optical axis, may then determine the angle of light which is reflected.

Thus, various ways are possible to implement the beam angle control.

The dynamic control explained above is based on using height information, i.e. local wave amplitude, to model the wave behavior. Accelerometers alone will suffice to obtain this information. In a more complex implementation, sensor orientation information from a tilt sensor (e.g. gyroscope) may also be used to better model the water surface behavior. This information then reports on the local water surface gradient rather than only the local water surface height.

Figure 6:
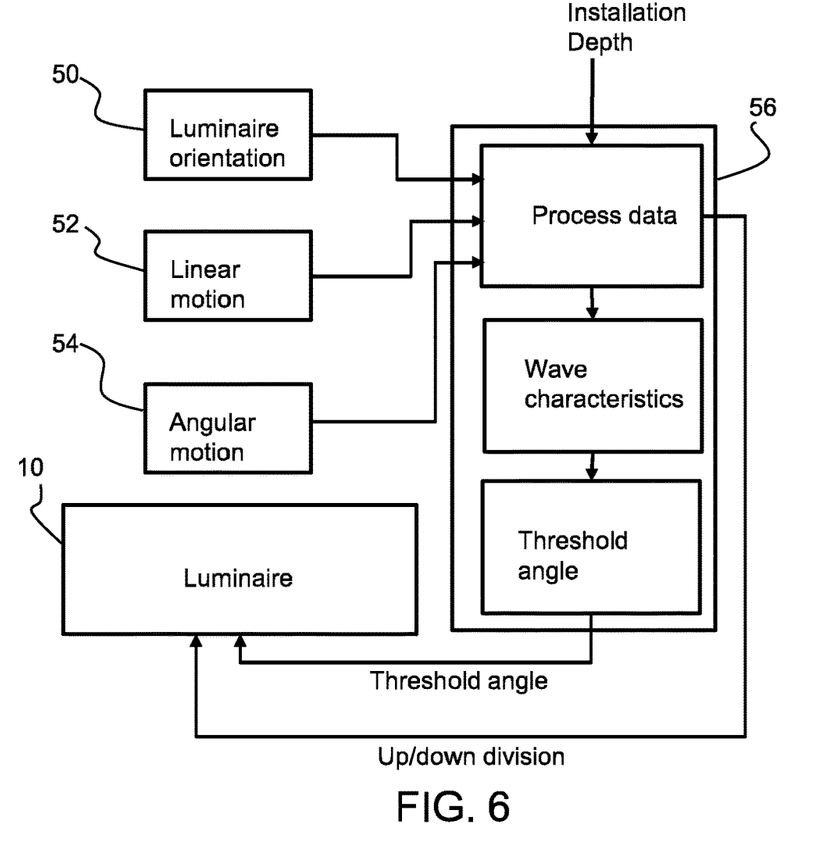
FIG. 6 shows the components of the system to explain the method of operation.

FIG. 6 shows the components of the system to explain the method of operation.

For the first aspect, the installation depth is provided to a controller 56. This information is processed to derive the way in which the light source arrangement will be controlled in terms of the division of upward and downward light.

For the second aspect, with dynamic control, there is an (optional) luminaire tilt sensor 50, a linear motion sensor (accelerometers) 52 and for more complex implementations an angular motion sensor (gyroscopes) 54. The sensor date is provided to the controller 56.

The controller processes the sensor data to derive the wave characteristics. These wave characteristics enable determination of a critical angle of the water surface in the vicinity of the luminaire over time. The processor determines the wave velocity, amplitude and direction.

From this, an instantaneous required threshold angle is derived. This is used to control the luminaire so that the upward light is all directed with an angle to the vertical greater than the threshold angle.

In another implementation, the amount of upward light may be tuned based on the level of daylight. In particular, for approximately the first 5 meters of depth, daylight is dominant, and it is likely that during peak daylight hours the upward beam contribution of the artificial lighting system is negligible. If this is detected (e.g. by a surface light sensor or PAR sensor, or an upward facing sensor at the luminaire), the upward light can be reduced or turned off to save energy. If reflective components are used, they could be moved to redirect the light downwardly. In both cases, this means the division of light between the first (downward) and second (upward) light output portions is altered.

The sensors may together form an attitude and heading reference system (AHRS).

The invention makes use of a light source arrangement which provides light with an upward component and light with a downward component. The upward component may for example be provided by upwardly facing light sources having a horizontal substrate. Similarly, the downward may be provided by downwardly facing light sources having a horizontal substrate. The light may be emitted offset from the normal direction to the substrate, hence also with a lateral (horizontal) component.

Alternatively, the light sources may be provided with tilted substrates, such that the substrate tilt determines the general illumination direction.

The light source arrangement may instead comprise vertical substrates, e.g. formed as an array disposed around a vertical axis. The light may again be emitted offset from the normal direction to the substrate, for example with one or more light output portions with an upward component and one or more light output portions with a downward component. Thus, the light output may be generated in the desired directions by various possible arrangements.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting system comprising:
    an aquaculture luminaire for underwater use, comprising:
    a light source arrangement for generating a first light output portion and a second light output portion, wherein, when the luminaire is in an intended operational orientation relative to a vertical axis, the light of the first light output portion has a downward direction component and the light of the second light output portion has an upward direction component,
    wherein the light of the second light output portion is all directed with an angle to the vertical axis greater than a threshold angle,
    wherein the light source arrangement comprises an array of light sources with different light sources providing a light output in different directions relative to the vertical axis,
    wherein the light source arrangement is configurable to adjust, in dependence on a depth at which the luminaire is to be used, a division of light between the first and second light output portions by actuating selected light sources of the array,
    wherein the light source arrangement is dynamically configurable in use,
    a motion and/or position sensor for sensing a motion and/or position of a water surface above the luminaire; and
    a controller for adapting the threshold angle dynamically in dependence on the motion and/or position of a water surface.

2. The luminaire of claim 1, wherein the array of light sources provide a light output in different radial directions relative to the vertical axis as well as different angles to the vertical axis.

3. The luminaire of claim 1, wherein the light source arrangement is dynamically configurable in use.

4. The luminaire of claim 3, comprising a tilt sensor for sensing an orientation of the luminaire relative to the vertical axis.

5. A lighting arrangement, comprising:
    at least one luminaire of claim 1;
    a float for floating on a surface of water; and
    a suspension system for suspending the at least one luminaire at a respective distance below the surface of the water, wherein the division of light between the first and second light output portions is configured in dependence on the respective distance.

6. A lighting system, comprising:
    a plurality of identical lighting arrangements of claim 5, at least some of which have their at least one luminaire at different depths and with differently configured division of light between the first and second light output portions.

7. The lighting system of claim 1, wherein the motion and/or position sensor comprises an accelerometer and a gyroscope.

8. The lighting system of claim 1, wherein the motion and/or position sensor comprises an array of accelerometers and an array of gyroscopes for monitoring the water surface at a plurality of locations.

9. The lighting system of claim 8, wherein the controller is adapted to:
    monitor the water surface height at said plurality of locations over time;
    determine a wave velocity, amplitude and direction from said water surface heights;
    determine a critical angle of the water surface in the vicinity of the luminaire over time based on the wave velocity, amplitude and direction; and
    configure the threshold angle in dependence on the critical angle.

10. The lighting system of claim 1, further comprising:
    a float for floating on a surface of water; and
    a suspension system for suspending the luminaire at a distance below the surface of the water.

11. The luminaire of claim 1, wherein the aquaculture luminaire comprises a beam shaping component in the path of the second light output portion and wherein the light source arrangement is configurable to adjust the threshold angle by adjusting the position of the beam shaping component.

12. A method of providing underwater lighting for aquaculture, comprising:
    providing a luminaire having a light source arrangement for generating a first light output portion and a second light output portion, wherein, when in an intended operational orientation relative to a vertical axis, the light of the first light output portion has a downward direction component and the light of the second light output portion has an upward direction component, wherein the light of the second light output portion is all directed with an angle to the vertical axis greater than a threshold angle;
    configuring, by actuating selected light sources of an array of light sources of the light source arrangement with different light sources providing a light output in different directions relative to the vertical axis, and in dependence on a depth at which the luminaire is to be used,
    a division of light between the first and second light output portions;
    monitoring the water surface height at a plurality of locations over time;
    determining a wave velocity, amplitude and direction from said surface heights;
    determining a critical angle of the water surface in the vicinity of the luminaire over time based on the wave velocity, amplitude and direction; and
    configuring the threshold angle dynamically in use in dependence on the critical angle.

13. The method of claim 12, wherein the luminaire comprises a beam shaping component in the path of the second light output portion, the method further comprising:
 configuring, by adjusting a position of the beam shaping component, the threshold angle of the luminaire.

* * * * *